Sept. 29, 1931.        W. H. SAUVAGE        1,825,366
REGULATOR FOR BRAKE RIGGING
Filed Aug. 16, 1928        2 Sheets-Sheet 2
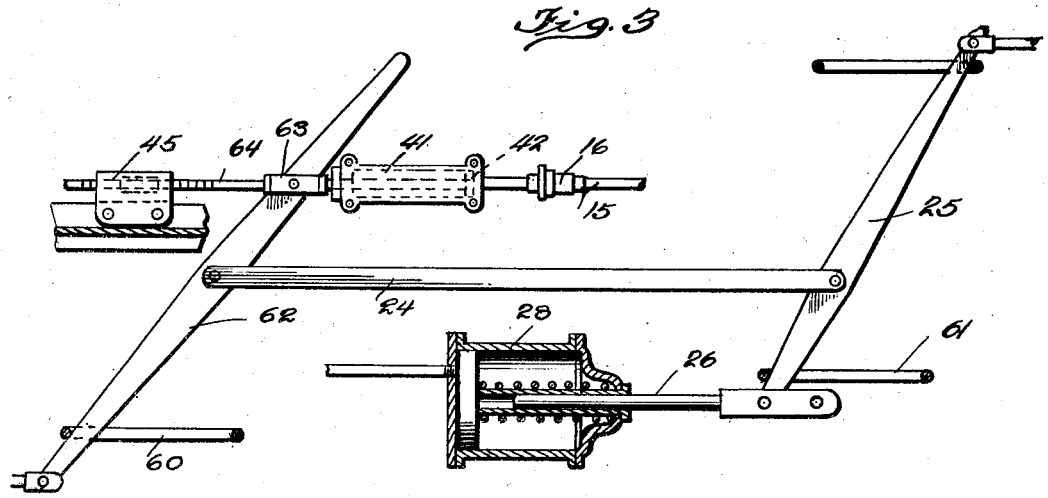
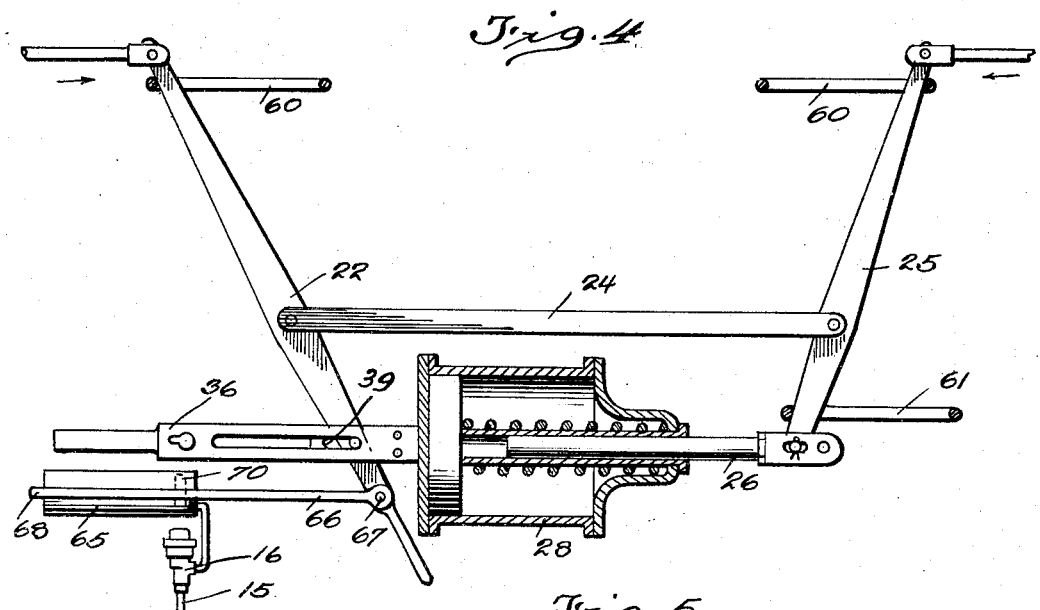
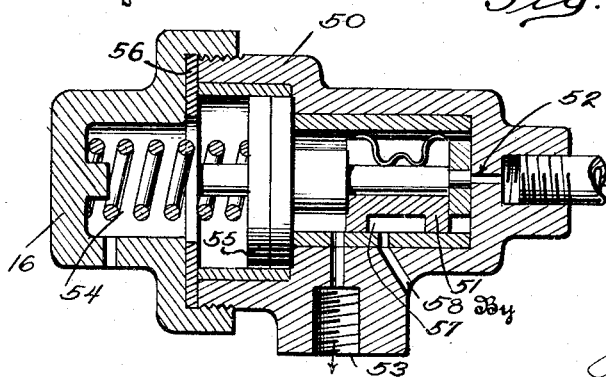

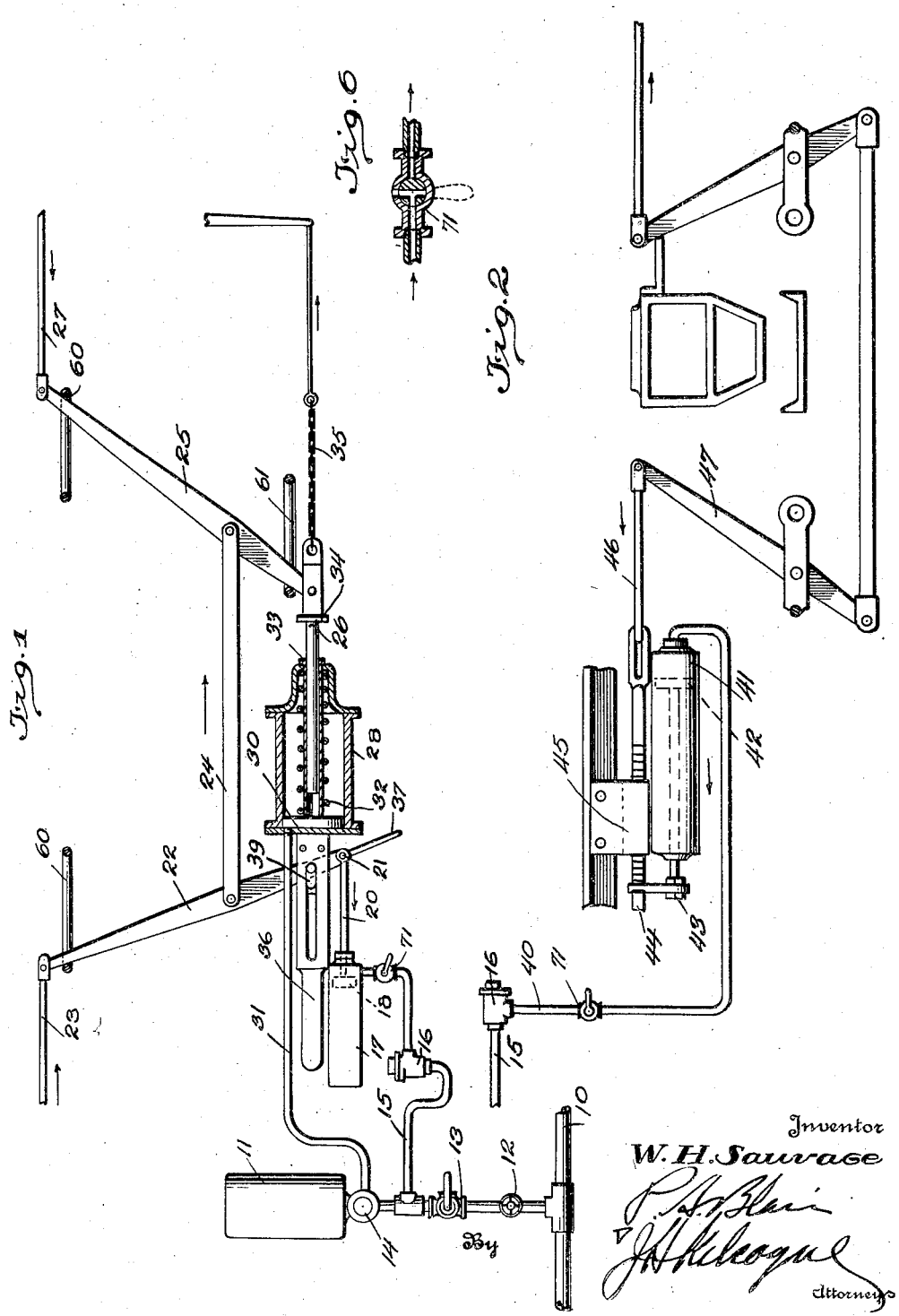

Patented Sept. 29, 1931

1,825,366

UNITED STATES PATENT OFFICE

WILLIAM H. SAUVAGE, OF NEW YORK, N. Y., ASSIGNOR, BY MESNE ASSIGNMENTS, TO ROYAL RAILWAY IMPROVEMENTS CORPORATION, OF NEW YORK, N. Y., A CORPORATION OF DELAWARE

REGULATOR FOR BRAKE RIGGING

Application filed August 16, 1923. Serial No. 299,977.

This invention relates to regulators for the brake rigging of railway vehicles and more particularly to a manual and pneumatic regulator as distinguished from automatic devices which have heretofore been attempted. In other words, the device hereinafter described may be actuated either manually or pneumatically by the engineer controlling the air brake system of the train.

In order that a clearer perception of the invention may be had and of the various objects sought to be accomplished, it may be stated that the present invention so far as its pneumatic features are concerned are entirely under the control of the engineer, and primarily permits the pneumatic regulation of the brakes of all of the cars of a train in an accurate and reliable manner while and when the train is being made up and the auxiliary reservoirs on each car are being charged. Thus the brakes of a train of one hundred cars, more or less, may be accurately adjusted to operate with the same identical pressure and each car will thereafter have the same piston travel and brake shoe clearance.

It is therefore one of the objects of the present invention to provide a relatively simple and practical mechanism associated with the train pipe of each car, and preferably the foundation brake rigging, whereby as the auxiliary reservoirs of each car are being charged, the initial low pressure during the charging operation will pneumatically control certain instrumentalities, thereby to regulate the entire brake rigging of that car. Each car in the entire train equipped with the invention is simultaneously regulated and the variations heretofore incident to intermittent manual regulation are entirely eliminated, and a great saving in time, labor and expense results.

A further object is to provide a mechanism of the above general character adapted to have associated therewith certain standard forms of manually actuated brake regulators now in general use, together with such mechanism as to pneumatically actuate these brake regulators during the charging of the auxiliary reservoirs.

A further object of the present invention is to provide a pneumatically actuated regulating means of the above character adapted to obviate certain objections heretofore incident to automatic slack adjusters which have been operated when the piston travel exceeded its normal predetermined distance. Such mechanisms have proven unreliable due primarily to the fact that it was attempted to adjust the brakes automatically on every application of the power brakes which has proven disastrous due to the unreliable functioning of the device by reason of the various pressures used during different applications, such as is normal and emergency brake applications. As is well known, when a car is running such automatic regulators function regardless of the cylinder pressure which may be anywhere from five to eighty-five pounds, depending upon the train line pressure. This together with variations in brake rigging, lost motion in various working parts as well as the car structure, make such attempted automatic adjustment vary to an inaccurate, unreliable and dangerous condition. It is accordingly a further object of the present invention to overcome these objections by the production of a relatively inexpensive and uniformly operable regulator mechanism.

Other objects will be in part obvious from the annexed drawing and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, drawings depicting several desired forms of the invention have been annexed as a part of this disclosure, and in such drawings, like characters of reference denote corresponding parts throughout all of the views, in which—

Fig. 1 is a semi-diagrammatic plan view of the complete mechanism showing such parts as are necessary to fully understand the invention as applied to the central foundation brake gear.

Fig. 2 is a similar view of the mechanism as applied to a truck brake rigging.

Fig. 3 is a plan view showing a different arrangement of foundation brake gear with the invention applied thereto.

Fig. 4 is a similar view of the parts shown in Fig. 1, in actuated position.

Fig. 5 is a detail sectional view of the control valve shown in Fig. 1.

Fig. 6 is a sectional detailed view of a cut out valve.

Referring now to the drawings in detail and more particularly to Fig. 1 showing standard foundation brake rigging and air brake mechanism, the numeral 10 indicates the main train pipe of the air brake system running from the locomotive and car to car through to the last car, and when the auxiliary reservoir 11 of each car is being charged prior to starting out a train, the air flows from this train pipe through a strainer 12, a cut-out valve 13, a triple valve 14 and thence to this reservoir 11 to charge the same to the desired pressure which may be assumed to be seventy pounds. Intermediate the train pipe and reservoir 11, there is located a branch pipe 15 and an automatic control valve 16 shown in detail in Fig. 5. Adjacent this control valve is a cylinder 17 provided with a piston 18 and piston rod 20 connected at 21 to one end of the dead cylinder lever 22. This cylinder lever is, as is well known to those skilled in the art, provided with a pull rod 23 at its opposite end going to one truck brake rigging while the rod 24 is connected to a live cylinder lever 25, actuated by means of a telescoping piston rod 26 to in turn actuate a pull rod 27 connected with the other truck brake rigging.

As herein shown, the air brake cylinder 28 is provided with a piston 30 forced outwardly by air passing through pipe 31 from the auxiliary reservoir 11 when the brakes are applied. This piston 30 is provided with a telescopic piston rod 32 having a collar at its end 33 adapted to engage an abutment 34 at the outer end of the piston rod 26. In other words, the piston preferably has a predetermined movement of approximately three or four inches before the collars 33 and 34 coact actually to apply the brakes. This construction while not absolutely essential is nevertheless highly desirable, as fully explained in my prior patents, for by reason of the lost motion between the piston head 30 and the piston rod 26 the live and dead cylinder levers which are supported in hangers 60 and 61 are maintained in such predetermined relation as to make it impossible to insert new brake shoes between the brake beams and peripheries of the wheels without first releasing the regulator mechanism. This feature has many obvious advantages in that the insertion of new brake shoes attempted without the release of the regulator mechanism would cause dragging brakes with consequent heated and cracked wheels as well as short piston travel. Hand brake mechanism is connected to the piston rod by means of chain 35 as indicated diagrammatically.

As the low pressure air from the train pipe 10 and branch pipe 15 passes through the control valve 16, hereinafter described in detail, the piston 18 is moved towards the left, thereby carrying the dead lever a corresponding amount and setting the brake shoes firmly against the wheels of both trucks. There is indicated at 36 a manually actuated regulator of that type illustrated and described in my Patent No. 1,681,053, issued August 14, 1928.

If any excess travel exists anywhere in the brake rigging, the movement of the piston 18 will actuate this regulator 36 in exactly the same manner as though the operator were to grasp the handle 37 and move the same manually, as explained in said patent.

If this type of regulator is not being used, the brakes may be equally well regulated at each truck as indicated in Fig. 2, that is, air from the branch pipe 15 passes through a similar control valve 16 connected with a pipe 40 which communicates with a cylinder 41 to actuate a piston 42 connected at its end 43 by a cross head with a ratchet bar 44 forming part of a regulator 45 mounted upon the draft sill and flexibly connected as by means of linkage 46 with a dead lever 47 of the truck brake rigging as shown in Fig. 2. This regulator 45 is of that type illustrated and described in my Patent, No. 1,681,052, issued August 14, 1928.

The control valve 16 which is connected with the pipe 15 or the pipe 40 according to the type of installation is illustrated in Fig. 5 and comprises a casing 50 having a slide 51. When the air enters this valve casing thru a restricted port 52, it leaks past the slide valve and out through a port 53 into the cylinder 17, Fig. 1, thus forcing the piston 18 inwardly to move the foundation brake rigging and cause the shoes to engage the peripheries of the wheels, as explained. If any excess travel occurs or exists over that provided for by the slot 39, Fig. 1, then of course the regulator 36 performs its take-up function. A spring 54 engaging the rear side of a piston 55 controls the position of the slide valve 51 and offers a low pressure resistance against the travel of the air-tight piston 55. However, when the air in the auxiliary reservoir 11 has been charged to a pressure of approximately thirty-five pounds, then the resistance of the spring 54 is overcome and the slide valve 51 moves towards the left against a leather gasket 56 sealing the casing 16. At the same time, a cavity 57 in the slide valve covers the outlet port 53 and connects this port with an exhaust port 58, thus permitting the air to drain from the actuating cylinder 17 into the atmosphere, thereby permitting the dead cylinder lever 22 to release to the extent of the lost motion device in the regulator, regardless of its type. The regulator piston 18 will thereafter remain in this released position while the auxiliary reservoirs are being charged, as well as during the subsequent operation of the brakes; in fact it has no other function to perform because only in rare instances will the pressure in the reservoir drop below thirty-five pounds, and at such times can do no harm.

It will thus be seen that the present invention operates the regulators of each car pneumatically instead of manually while the car reservoirs are being charged. Any number of cars may be regulated and adjusted in exactly the same way and with the same pressure on each regulator which will not vary like the human element; in fact the brakes of the entire train may be regulated in less than a minute and thus the tremendous saving in time, labor and expense will be apparent.

In Figure 3 there is shown a slightly different arrangement of foundation brake levers such as used on passenger cars. The piston rod 26 is connected with the live lever 25 which in turn is connected by a tie rod 24 with a dead lever 62, oppositely positioned from the arrangement shown in Figure 1, that is, the fixed end of the lever is pivotally mounted in a slotted member 63 at one end of a regulating ratchet rod 64 passing through the regulator casing 45, which is of the same construction as shown in Figure 2. This ratchet rod is actuated by means of the same type of cylinder 41 and piston 42 from air admitted through a pipe 15 and control valve indicated at 16.

Figure 4 is substantially the same as the arrangement shown in Figure 1, except the piston 65 is reversed, thereby doing away with leaky stuffing boxes. This feature of construction comprises a bifurcated rod 66 connected with opposite sides of the dead cylinder lever 22 at the point 67 and passes above and below the cylinder 65 and is connected at its ends by a cross head 68 with the piston rod within the cylinder. Thus when air is admitted through the pipe 15 it will force the piston 70 towards the left and actuate the regulator 36 in the manner heretofore described.

In Figure 6 there is illustrated in section a cut-out valve 71 which may be interposed between the control valve 16 and the pneumatically actuated member 17. This cut-out valve is of an ordinary three-way type whereby the operator may cut out the pneumatic feature and permit the regulator to be more easily manually operated.

In all of these several embodiments the general principles and constructions involved are substantially the same, that is on charging the auxiliary reservoirs of the several cars composing a train the initial low pressure air will pneumatically regulate the brakes of each car to a uniform extent and pressure and when this pressure as it builds up exceeds a certain predetermined amount then the air to the regulating control valve is cut off, the auxiliary reservoirs charged to their full extent, and the pneumatic devices drain to the atmosphere back through the control valve.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:—

1. In a brake regulating device of the character described, in combination, a brake lever, a manually actuated regulator including a lost motion device connected to said lever, and pneumatically actuated means for actuating said regulator.

2. In a brake regulating device of the character described, in combination, a brake lever, a pneumatically actuated piston for moving said brake lever, means associated therewith including a lost motion device for permanently holding any excess travel exceeding the lost motion device, a train pipe, an auxiliary reservoir adapted to be charged therefrom, and a control valve connected with the train pipe and adapted to divert a portion of the air leading to said auxiliary reservoir for actuating said pneumatically controlled piston.

3. In a brake regulating device of the character described, in combination, a brake lever, a manually actuated regulator including a lost motion device connected to said lever, and pneumatically actuated means for actuating said regulator, said pneumatically actuated means being connected with the train pipe of the car.

4. In a brake regulating device of the character described, in combination, a brake lever, a pneumatically actuated piston for moving said brake lever, means associated therewith including a lost motion device for permanently holding any excess travel exceeding the lost motion device, a train pipe, an auxiliary reservoir adapted to be charged therefrom, and a control valve connected with the train pipe and adapted to divert a portion of the air leading to said auxiliary reservoir for actuating said pneumatically controlled piston, said control valve including a casing, a spring actuated piston in said casing, inlet and outlet ports to said casing, and a valve connected with the piston for effectively closing the inlet port and allowing the outlet port to drain to the atmosphere.

5. In a brake regulating device of the character described, in combination, a brake lever, a manually actuated regulator connected to said lever, pneumatically actuated means for actuating said regulator, said pneumatically actuated means being connected with the train pipe of the car, and a control valve interposed between the train pipe and the pneumatically actuated member adapted to permit the latter to actuate only at low pressure.

6. In a brake regulating device of the character described, in combination, a brake lever, a pneumatically actuated member connected with said lever and adapted to move the same, a permanent take-up and holding device associated with said lever for absorbing any excess travel over and above brake shoe clearance, a train pipe and a control valve for actuating said pneumatically actuated member at low pressure and automatically cut out said pneumatically actuated member when the train pipe pressure reaches a predetermined point.

7. In a brake regulating device of the character described, in combination, a brake lever, a manually actuated regulator connected to said lever, and pneumatically actuated means for actuating said regulator, said pneumatically actuated means being connected with the train pipe of the car, and a control valve interposed between the train pipe and the pneumatically actuated member adapted to permit the latter to actuate only at low pressure, said control valve including a casing having inlet and outlet ports, and a valve within the casing for effectively closing the inlet port and allowing the outlet port to drain to the atmosphere.

8. In a brake regulating device of the character described, in combination, a brake lever, an air brake cylinder, a piston in said cylinder having a lost motion movement prior to the actuation of said lever, a regulator having a lost motion device connection with said lever, and a pneumatically actuated member connected with said lever and regulator and also the train pipe whereby said regulator may be actuated by air from the train pipe.

9. In a brake regulating device of the character described, in combination, a brake lever, a manually actuated regulator connected with said lever and having a lost motion device for insuring brake shoe clearance, pneumatically actuated means including a piston connected with said lever for moving the same whereby excess travel is taken up by said regulator, a train pipe, a control valve interposed between the train pipe and the pneumatically actuated member adapted to function at low pressure whereby said brakes are regulated pneumatically while the auxiliary reservoir is being charged from said train pipe.

10. In a brake regulating device of the character described, in combination, a brake lever, an air brake cylinder, a piston in said cylinder having a lost motion movement prior to the actuation of said lever, a regulator having a lost motion device connection with said lever, a pneumatically actuated member connected with said lever and regulator and also the train pipe whereby said regulator may be actuated by air from the train pipe, and a control valve between the train pipe and the pneumatically actuated member adapted to permit actuation of the latter only during the low pressure charging of the auxiliary reservoir.

11. In a brake regulating device of the character described, in combination, a brake lever, an air brake cylinder, a piston in said cylinder having a lost motion movement prior to the actuation of said lever, a regulator having a lost motion device connection with said lever, a pneumatically actuated member connected with said lever and regulator and also the train pipe whereby said regulator may be actuated by air from the train pipe, and a control valve between the train pipe and the pneumatically actuated member adapted to permit actuation of the latter only during the low pressure charging of the auxiliary reservoir, said control valve including a spring actuated piston adapted to be pneumatically moved against the action of the spring when the pressure exceeds a predetermined amount thereby to open the exhaust port from said control valve to the atmosphere.

12. In a brake regulating device of the character described, in combination, a brake lever, a pneumatically actuated regulator including a lost motion device connected to said lever, and pneumatically actuated means for actuating said regulator, said pneumatically actuated means having a valve associated therewith and adapted to be connected with the train pipe, thereby to operate only at low pressure.

13. In a brake regulating device of the character described, in combination, a brake lever, a pneumatically actuated regulator including a lost motion device connected to said lever, pneumatically actuated means for actuating said regulator connected with the train pipe, and a low pressure valve associated with said parts adapted to permit operation of said pneumatically actuated means only at low pressure.

14. In a brake regulating device of the character described, in combination, a brake lever, a pneumatically actuated regulator connected to said lever, pneumatically actuated means for actuating said regulator, a pneumatic cylinder and piston connected with said lever, a train pipe, and a valve connected between the train pipe and the cylinder adapted to cause an actuation of the regulator during charging of the system.

15. In combination with the foundation brake rigging including an airbrake cylinder, a piston rod and a cylinder and floating lever, of means for taking up the excess travel in the rigging comprising a movable support for the normally fixed end of the floating cylinder lever, a pawl and ratchet device associated with said means, and an auxiliary cylinder and piston rod adapted to move the movable support for said lever and cause said pawl to move to a new position on said rack when and if excess travel exists, said last piston rod being connected to said floating cylinder lever substantially at its normally fixed end.

16. In combination with the foundation brake rigging including an airbrake cylinder, a piston rod and a cylinder and floating lever, of means for taking up the excess travel in the rigging comprising a movable support for the normally fixed end of the floating cylinder lever, a pawl and ratchet device associated with said means having lost motion for insuring brake shoe clearance, and an auxiliary cylinder and piston rod adapted to move the movable support for said lever and cause said pawl to move to a new position on said rack when and if excess travel exists, said last piston rod being connected to said floating cylinder lever substantially at its normally fixed end, said cylinder lever being provided with a means whereby it may be moved manually if and when desired to take up excess travel.

Signed at New York, New York, this 3rd day of August, 1928.

WILLIAM H. SAUVAGE.